Jan. 31, 1956 M. VANZO 2,732,884
MACHINE FOR MAKING REINFORCED RUBBER TUBING
Filed May 2, 1950 10 Sheets-Sheet 1

INVENTOR
MARCELLO VANZO,
BY Stone, Boyden + Mack
ATTORNEYS

INVENTOR
MARCELLO VANZO,
BY Stone, Boyden + Mack,
ATTORNEYS.

FIG. 10

INVENTOR
MARCELLO VANZO,
BY *Stone, Boyden & Mack*
ATTORNEYS

United States Patent Office 2,732,884
Patented Jan. 31, 1956

2,732,884
MACHINE FOR MAKING REINFORCED RUBBER TUBING

Marcello Vanzo, Milan, Italy, assignor to Pirelli S. p. A., Milan, Italy

Application May 2, 1950, Serial No. 159,434
Claims priority, application Italy May 10, 1949
8 Claims. (Cl. 154—6)

This invention pertains to yarn winding machines and more particularly has reference to machines for spirally winding on the outside of uncured rubber tubing a covering consisting of a double layer of reinforcing yarn with a thin rubber sheeting interposed between said layers.

Heretofore, machines for covering rubber hose, used for conducting fluids under pressure, with reinforcing yarn have applied the yarn in the form of braided strands in order to strengthen the rubber of the hose against high internal stresses. Such equipment, known as "braiding machines," are attended with certain serious disadvantages, such as complicated mechanism and slow operation, owing to the complexity of motions of the bobbins which have to move along continuously crossing paths, all of which adds materially to the cost of the machines and the cost of production.

It is an object of this invention to provide a greatly simplified and less expensive machine for applying a covering of reinforcing yarn to rubber hose, wherein the strands of yarn are applied to the outside of the rubber tubing in two separate layers wound spirally in opposite directions, with a thin sheet of rubber interposed between said layers.

Another object of this invention is to provide a machine of this type wherein the rubber sheet is applied by simultaneously applying a strip of rubber longitudinally between the layers of yarn.

A further object is to provide a machine for applying to rubber tubing a spirally wound yarn covering, which possesses a strength and flexibility equal to a braided yarn covering, at a speed several times greater than that obtained from prior art braiding machines.

A still further object of this invention is to provide a reinforcing covering for rubber tubing consisting of two layers of yarn wound spirally in opposite directions with a layer of rubber strip longitudinally interposed between the layers of yarn and vulcanized thereto.

A still further object is to provide a greatly simplified yarn winding machine in which a plurality of groups of bobbins are moved along non-intersecting circular paths.

With these and other objects in view which may be incident to my improvements, my invention consists in the combination and arrangement of steps and elements hereinafter described and illustrated in the accompanying drawings, in which.

The same reference characters denote the same parts throughout all views of the drawings.

Figures 1, 2:
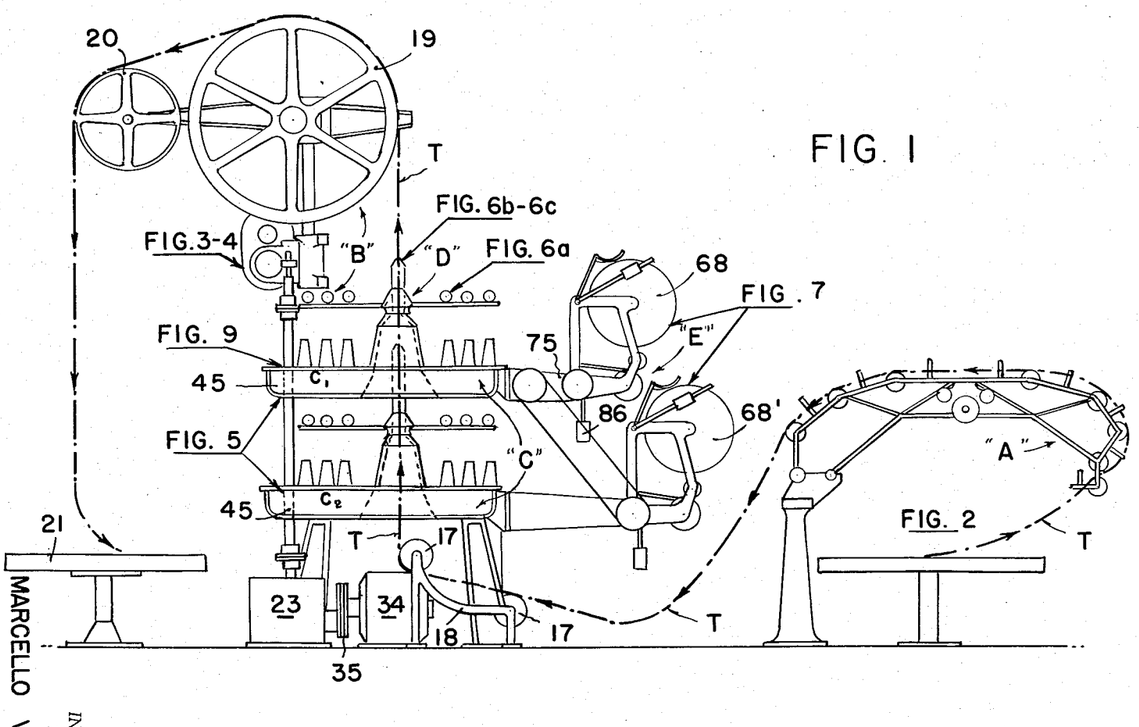
Fig. 1 is a schematic side elevation of my improved yarn winding machine in which the principal parts are indicated in associated groups which are shown in further detail in Figs. 2–10, incl.
Fig. 2 is a schematic side elevation, on a larger scale of the rubber tubing unwinding device.

Referring first to Figure 1, my improved yarn winding machine comprises generally the following principal components, through which the rubber tubing before and after winding with yarn travels, as indicated by the heavy dot and dash line.

Figure 3:
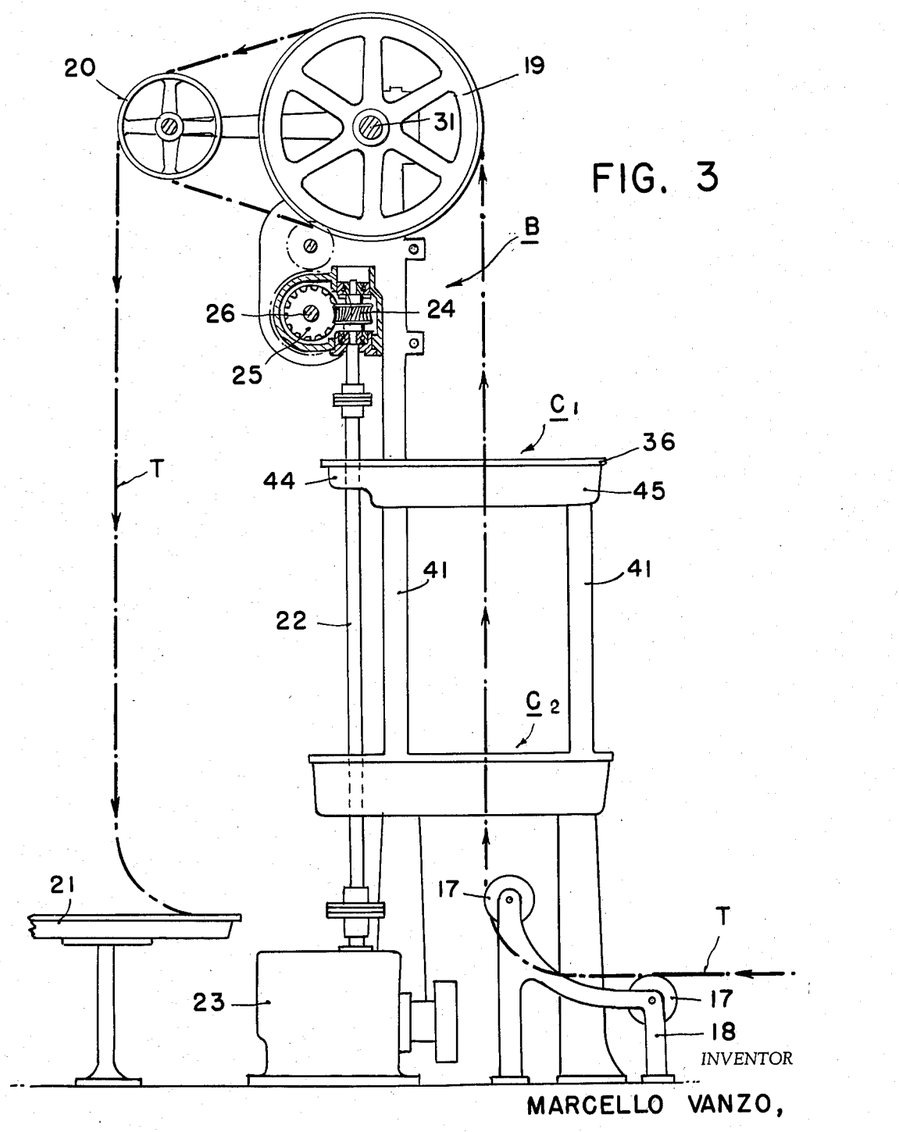
Fig. 3 is a schematic side elevation of the yarn winding machine, showing in section a detail of the hose traction gear.
Figure 4:
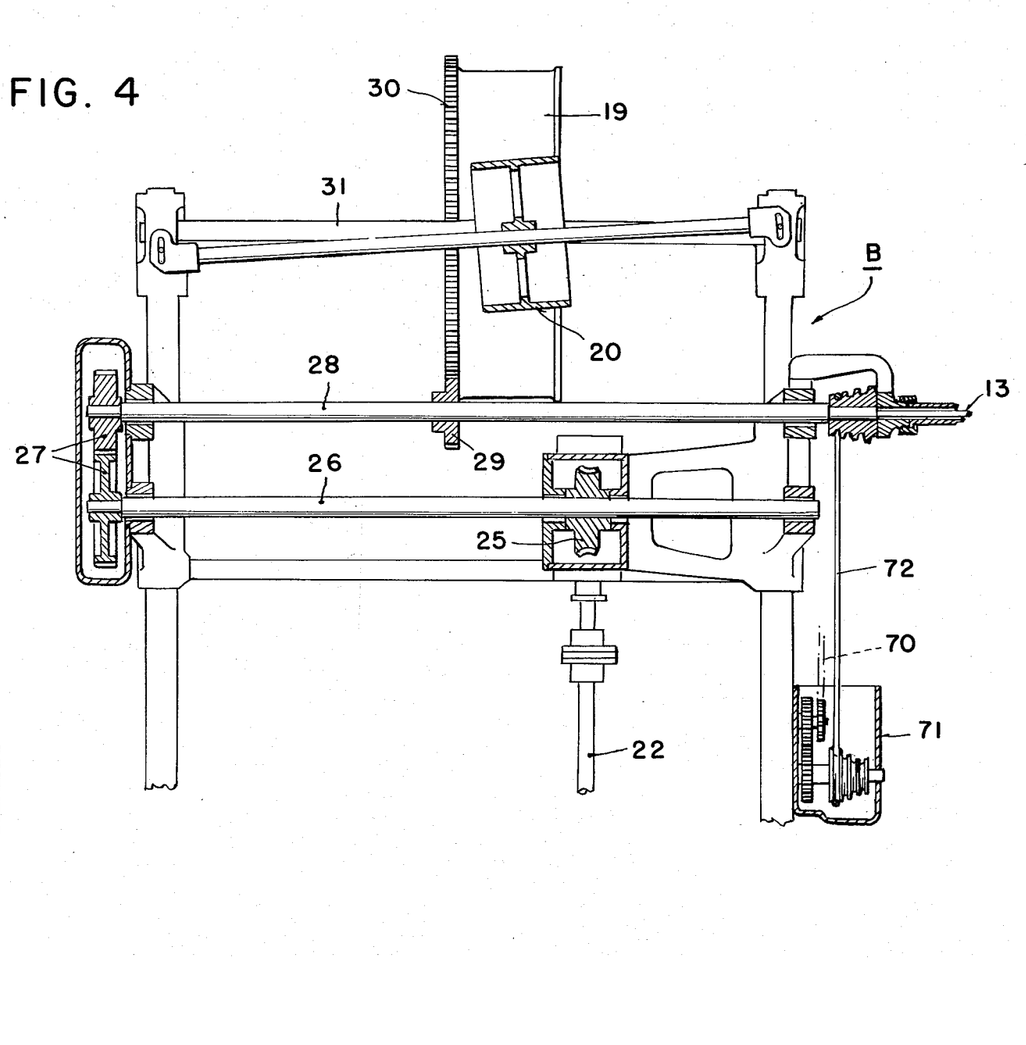
Fig. 4 is a schematic partial front elevation of the hose traction gear, showing in section gears by which the rubber strip feeding device is controlled.
Figure 5:
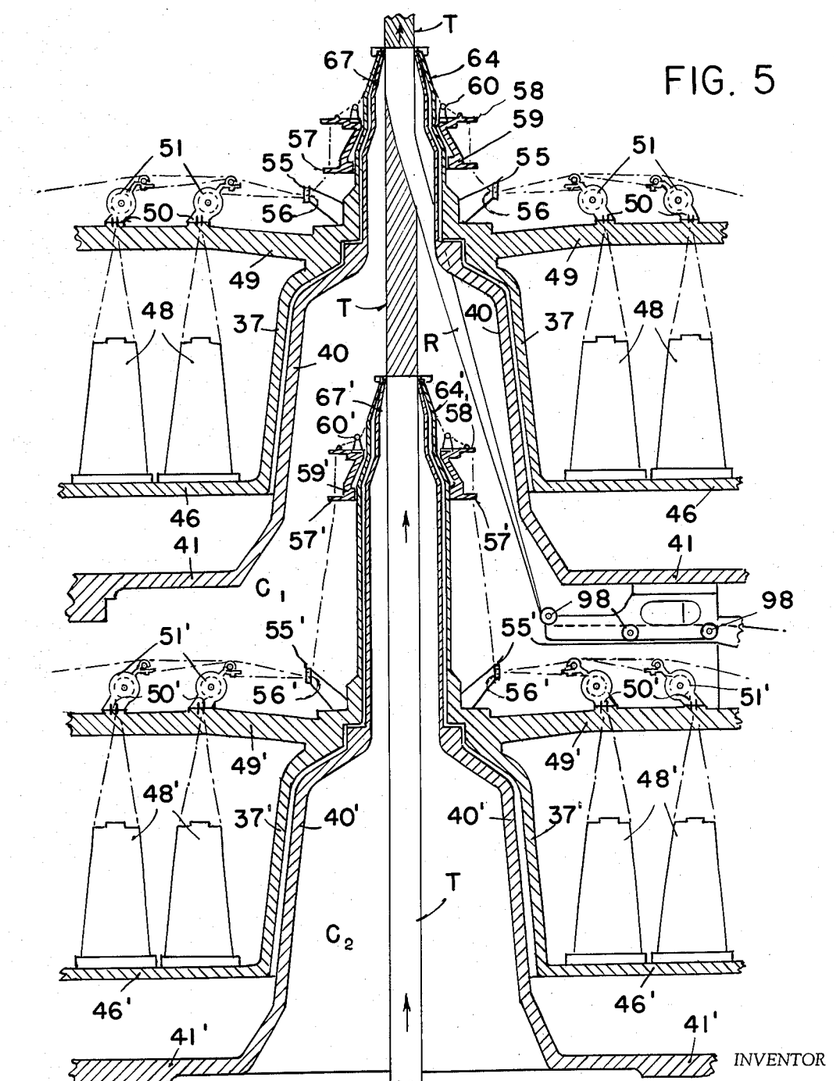
Fig. 5 is a central vertical section partly diagrammatic, of the central portion of my improved winding machine, showing the two turntables C and yarn spindles mounted thereon.
Figures 6A, 6B, 6C:
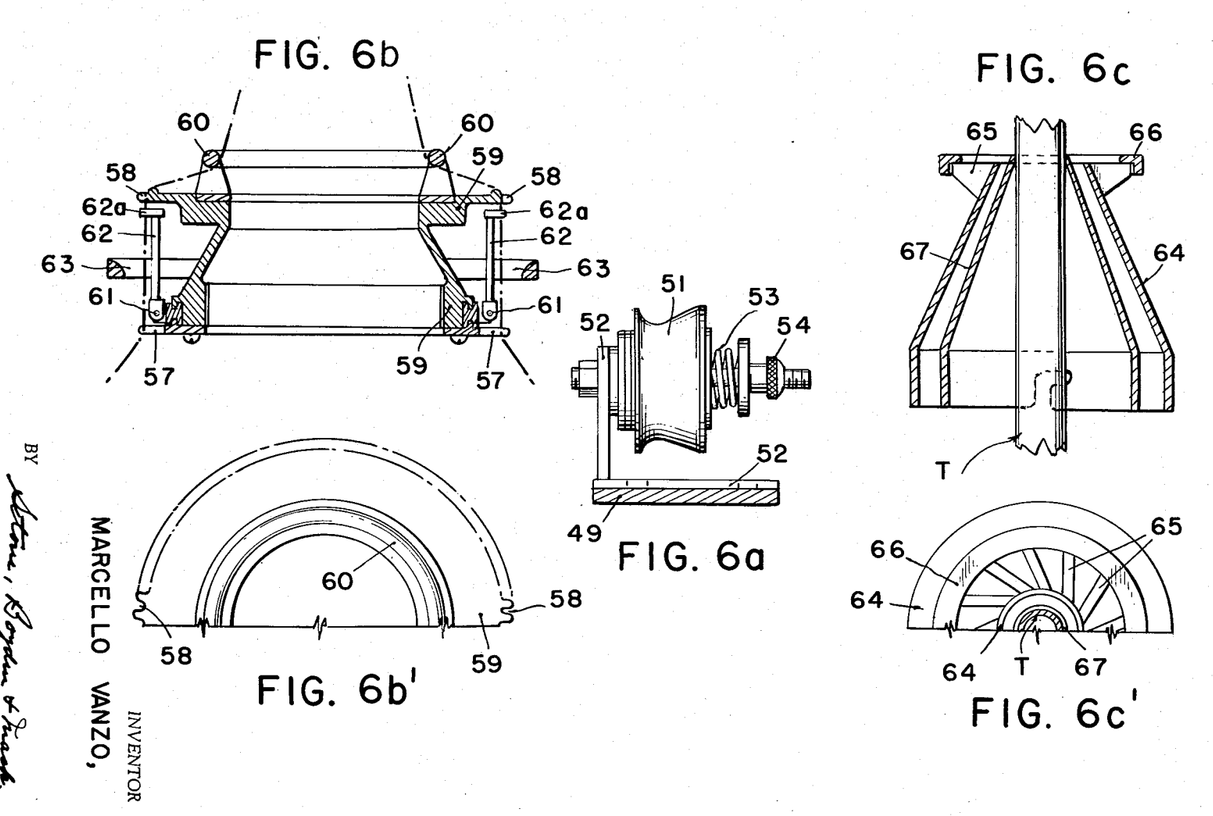
Fig. 6a is a side elevation, on an enlarged scale of one of the yarn guide bushings shown in Fig. 5.
Fig. 6b is a central vertical section (and half plan), partly diagrammatic, of one of the yarn guide crowns shown in Fig. 5.
Fig. 6c is a central vertical section (and half plan), partly diagrammatic, of one of the drift cones shown in Fig. 5.
Figure 7:
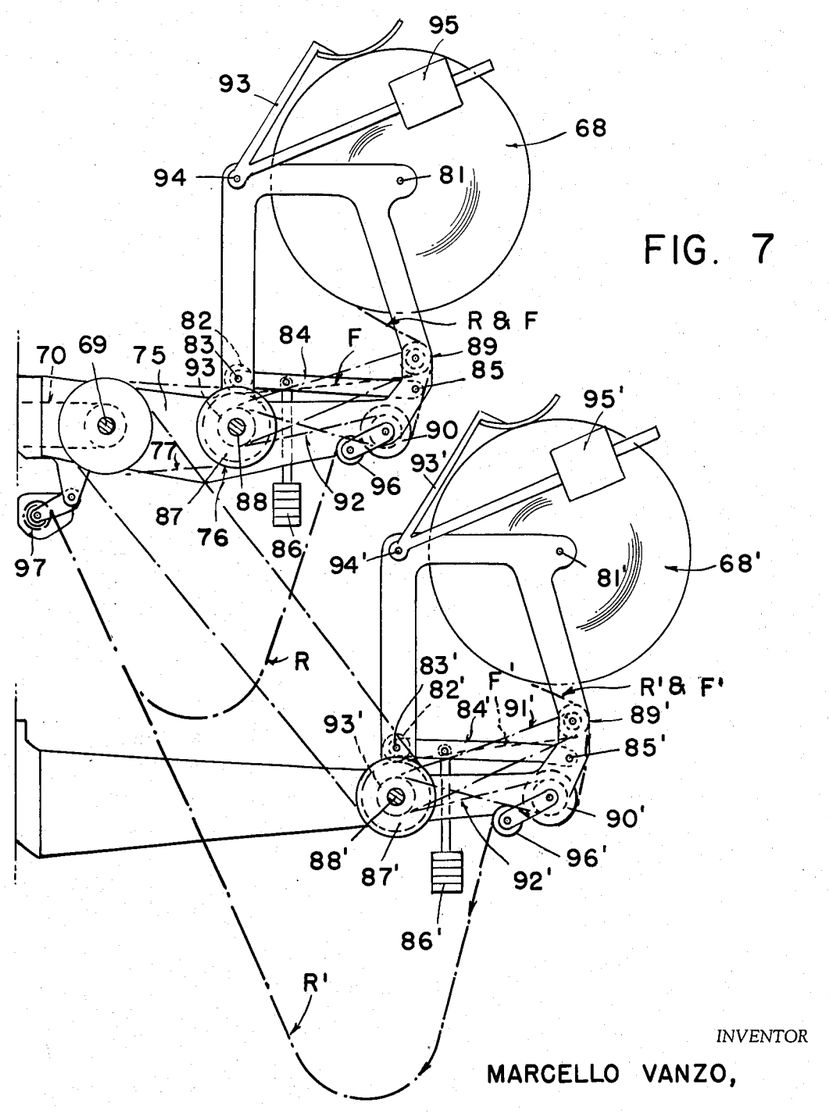
Fig. 7 is a schematic side elevation, on an enlarged scale of the upper and lower rubber strip feeding devices, as indicated in Fig. 1.
Figure 8:
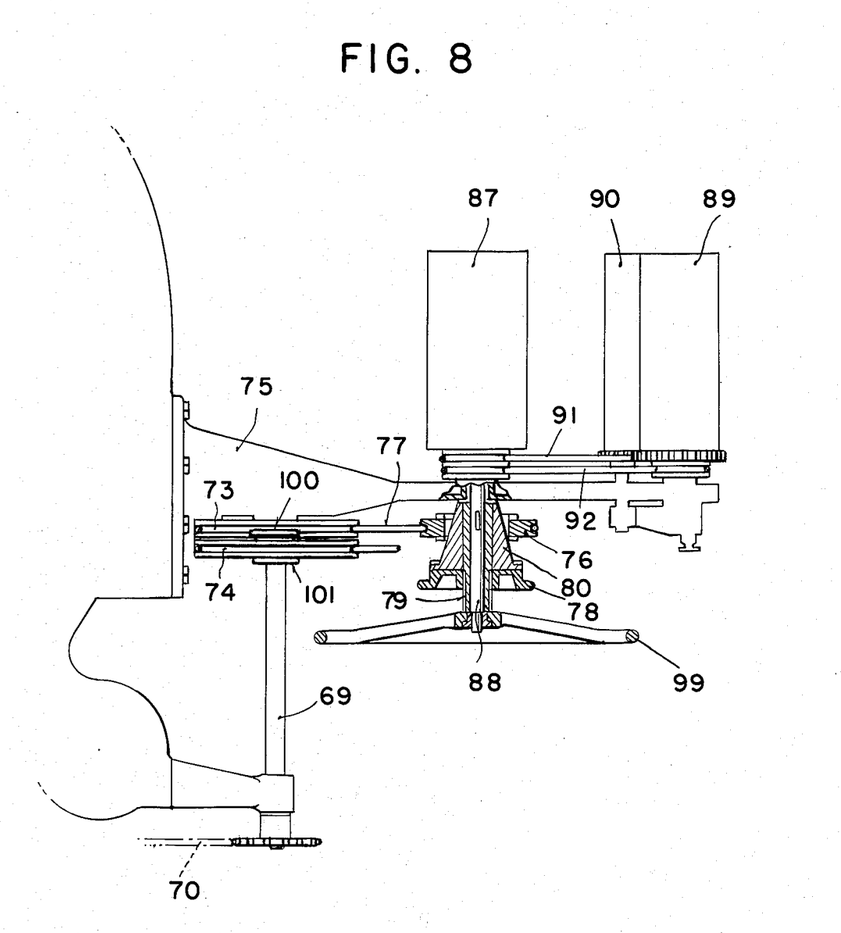
Fig. 8 is a schematic plan view of the lower part of the upper rubber strip feeding device of Fig. 7, showing, in section, gear for the continuous variation of speed of said device.
Figure 9:
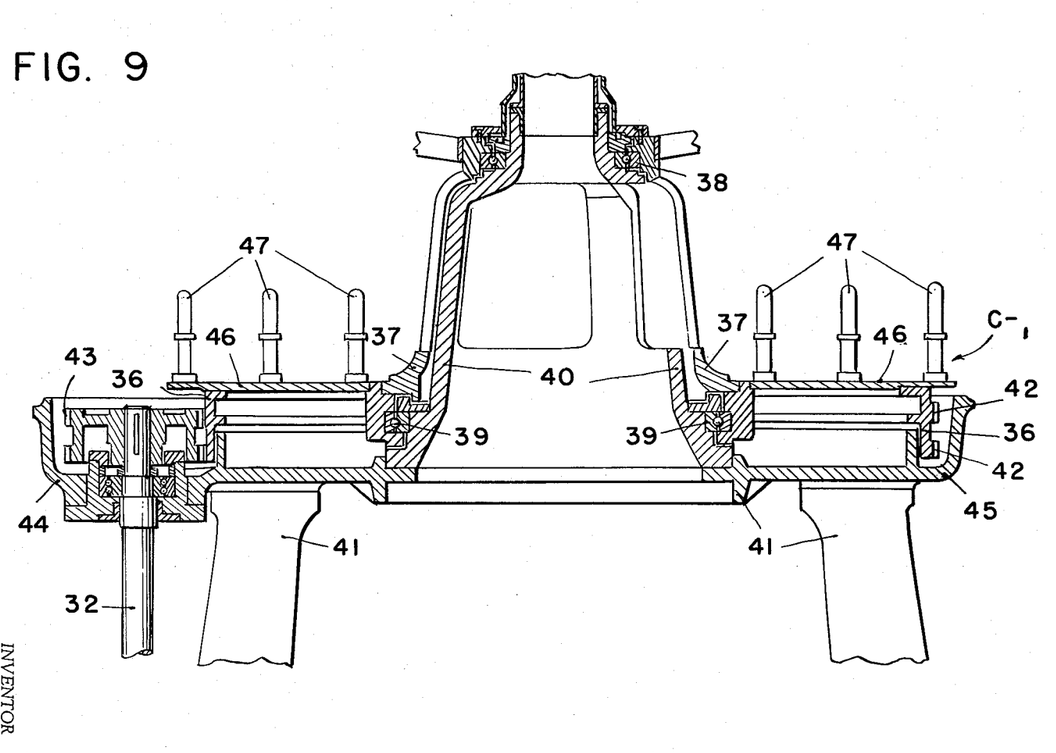
Fig. 9 is a central, longitudinal section, on an enlarged scale (partly diagrammatic) of the upper turntable indicated in Fig. 1 and shown in Fig. 5.
Figure 10:
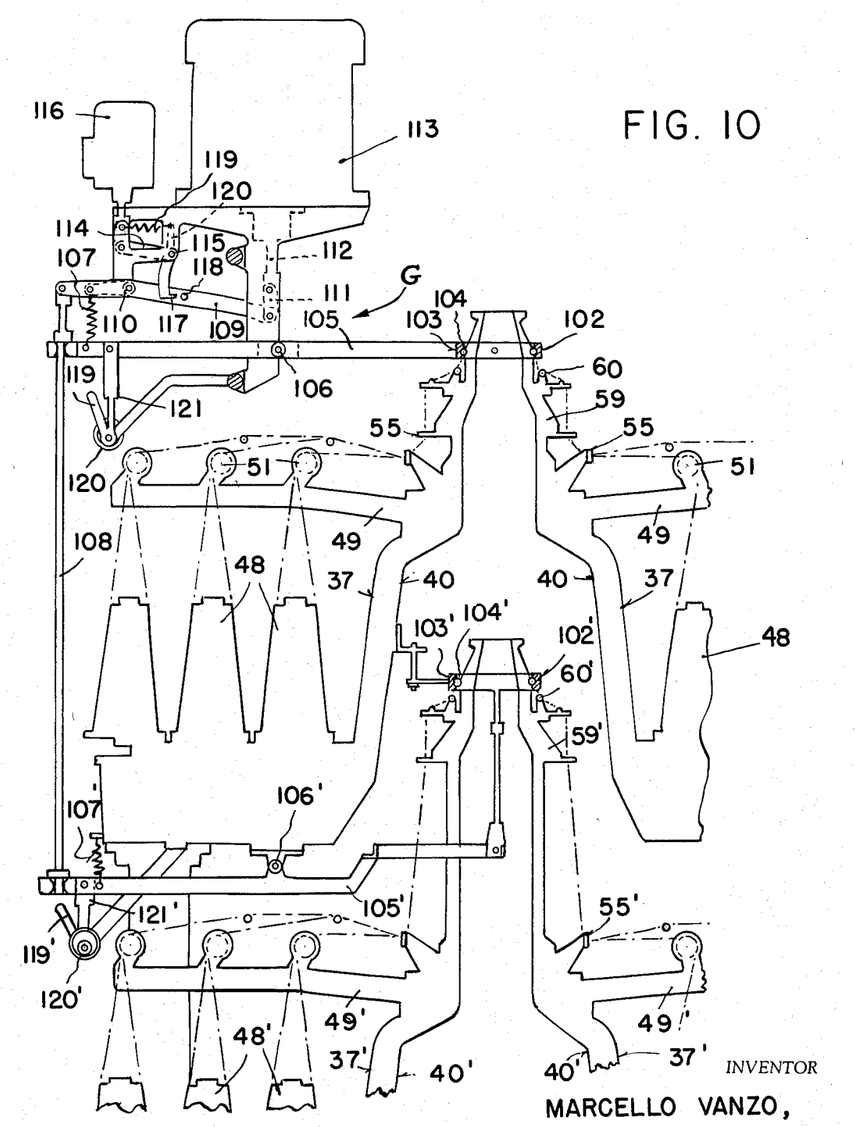
Fig. 10 is a diagrammatic view of the yarn locking device.

A—rubber tubing unwinding device (Fig. 2);
B—rubber tubing traction device (Figs. 3 and 4);
C—upper and lower turntable units (Figs. 5 and 9);
D—yarn feeding device (Figs. 5 and 6);
E—rubber strip feeding device (Figs. 7 and 8);
G—yarn locking device (Fig. 10).

As indicated in Fig. 1, the rubber tubing, coming from unwinding device A, is drawn up through the center of turntables C by traction device B. The first layer of yarn is wound spirally around the rubber tubing near the top of lower turntable $C_2$; a thin rubber strip, coming from feeding device E, is then applied longitudinally over the inner layer of yarn, between lower and upper turntables C; and the outer layer of yarn is then wound spirally in the opposite direction around the rubber strip, near the top of upper turntable $C_1$. The yarn-covered tubing then passes up over drum 19 and pulley 20 (Fig. 1) at the top of tube traction device B, and travels down to rotating cylindrical table 21, where it is coiled up into coils of convenient size. Subsequently, during the vulcanization, which is performed in the usual way, the rubber strip is vulcanized to the inner and outer layers of yarn, so as to form a unitary yarn-covered hose.

*Rubber tubing unwinding device*

Referring to Fig. 2, the reference 1 denotes a shallow cylindrical pan which is attached by a circular plate 2 to a shaft 3, rotatably supported by ball bearings 4, mounted in a hollow cylindrical column 5, which is secured to a base plate 6. The rubber tubing to be covered with yarn is coiled around a cylindrical core of suitable size which is placed in pan 1 from which the tubing is unwound by unwinding device A and passed to the yarn winding machine continuously, as indicated by the heavy dot and dash line in Fig. 1.

Figures 2, 2A:
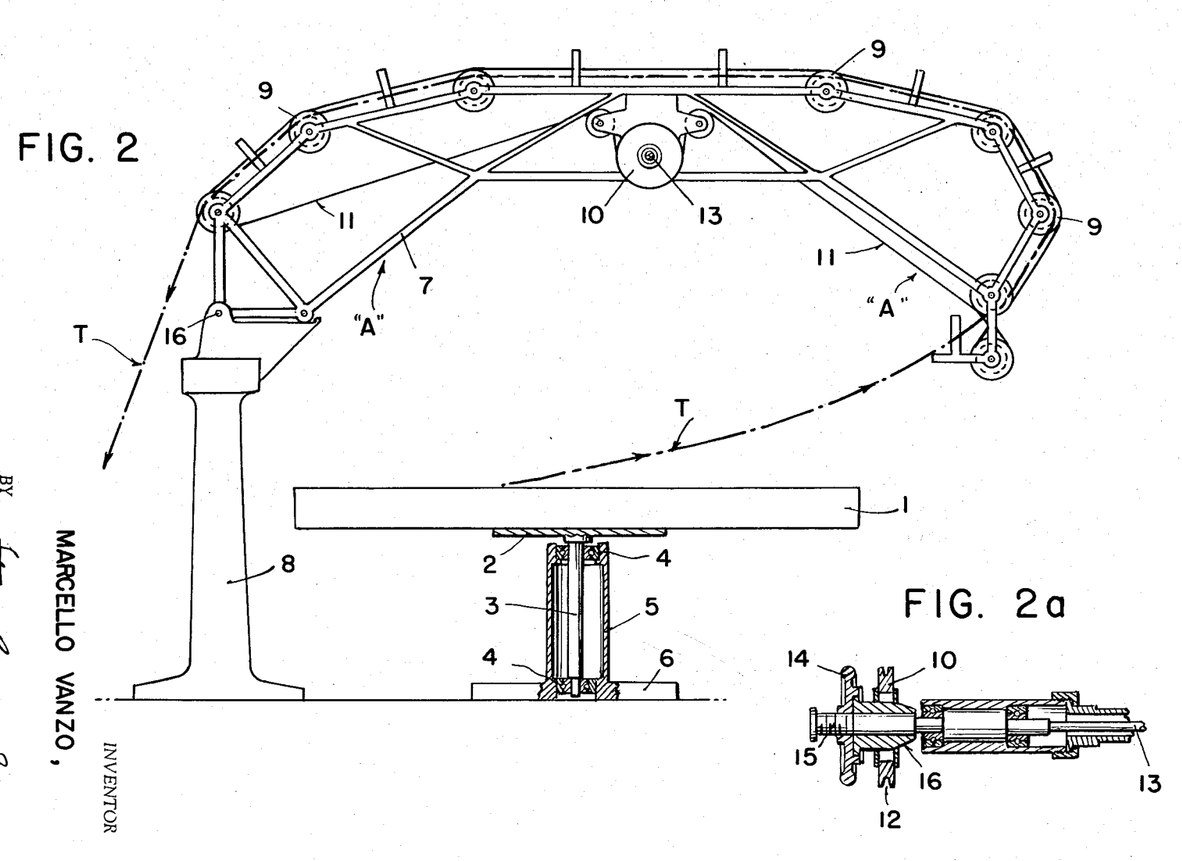
Fig. 2a is a central longitudinal section, on an enlarged scale, of the variable speed gear of Fig. 2.

The unwinding device A comprises a light welded metal frame 7, which is supported by a column 8, and carries a series of suitably spaced rollers 9, driven by a driving pulley 10, through the medium of a belt 11, which passes around the outside of all the rollers 9 and engages a V-shaped groove in said rollers, similar to groove 12 in driving pulley 10 (see Fig. 2a). Each roller 9 is provided with a groove shaped to accommodate the rubber tubing which passes over said rollers, as indicated by the arrows in Fig. 2. Pulley 10 is driven by a flexible shaft 13 from the yarn winding machine at a speed directly related to the speed at which the tubing is fed through the winding machine. As the rubber tubing at this stage has no yarn covering, its strength is low, and it is therefore essential that the speed of the tubing passing over the unwinding device A be exactly adjusted to the feeding speed of the unwinding machine, in order to avoid tension and stretching of the rubber tubing. This is accomplished by making the roller 10 of the expansible-sector type, whereby its diameter may be suitably varied as shown in Figure 2a. The expansible sectors of pulley 10 are radially adjusted by a conical hub 16 on which they are mounted; said hub being moved axially with reference to pulley 10 by a handwheel 14 threaded on hub 15 which is loosely mounted on the left end of shaft 13. By the manual rotation of handwheel 14, the diameter of pulley 10 can be varied as desired to obtain the required speed of the rubber tubing through the unwinding device A. Frame 7 is hinged to column 8 by an axle 16 so that said frame may be raised to facilitate the placing in pan 1 of the coils of rubber tubing to be covered with yarn.

The tubing, coming from unwinding device A, is guided into the lower section of the spiral winding machine (see Fig. 3) by two guide pulleys 17, supported by a bracket 18. The tubing is then drawn vertically upward, by traction device B, through lower and upper turntable unit C, in which the first spiral yarn covering, the rubber strip covering, and the second yarn covering, are successively applied. The covered tubing is then wound two or more turns around a traction drum 19 and a return pulley 20 and is then fed vertically downward to a stationary cylindrical pan 21 in which it is coiled by hand. Traction drum 19 is driven through a vertical shaft 22 by the driving unit 23 of the spiral winding machine, as further described hereinafter. Keyed to the upper end of shaft 22 is a worm 24 which engages a worm gear 25, keyed to a shaft 26, by which power is transmitted through meshing gears 27 to a shaft 28, whereon is keyed a pinion 29 which engages a gear wheel 30, fixed to shaft 31 on which drum 19 is mounted. (See Figs. 3 and 4.) Gear wheels 27 are interchangeable, whereby the feeding speed of the rubber tubing can be varied within given limits. By thus varying the feed of the tubing, while the rotary speed of turntable unit C is left unchanged, the pitch of spiral winding can be altered as desired. Flexible shaft 13, by which unwinding device A is driven, is connected to one end of shaft 28 and thus follows all variations of rotary speed of drum 19 in constant ratio.

Turntable units

As shown in Figs. 1, 3, 5 and 9, the spiral winding device consists basically of two identical turntable units $C_1$ and $C_2$ which are rotated in opposite directions. The lower unit $C_2$ and traction drum 19 are driven by the same shaft 22, while the upper unit $C_1$ is driven by a separate shaft 32 (Fig. 9). Both shafts 22 and 32 are connected to motor unit 23 (Figs. 1 and 3) which is driven by an electric motor 34 through a V-belt transmission 35 (Fig. 1). Unit 23 acts as a reduction gear and a change speed gear by which the rotating speed (R. P. M.) of shaft 32 and upper turntable unit $C_1$ can be varied within given limits, whereby the relative pitches of the two spiral yarn coverings can be correspondingly varied.

As both upper and lower turntable units $C_1$ and $C_2$ are identical, only the upper unit $C_1$ will be further described. Unit $C_1$ comprises an annular revolving turntable 36, rigidly attached to a rotating support 37 which is carried by upper and lower ball bearings 38 and 39, mounted on a fixed support 40, attached to frame 41 of the machine. (See Fig. 9.) On the outer periphery of turntable 36 are double helical gear teeth 42 which mesh with the teeth on a pinion 43 which is keyed to drive shaft 32 and is enclosed within a gear box 44. Turntable 36 is similarly enclosed by a box 45. Rigidly attached to the upper face of turntable 36 is an annular plate 46 whereon are secured a plurality of rows of bobbin pins 47 equi-spaced radially about the center of rotation of turntable 36. Corresponding elements of lower turntable unit are denoted by the same reference numerals, primed.

Yarn feeding device

As shown in Figure 5, the yarns are contained on conical bobbins 48, each of which is positioned over a pin 47, and the yarns are unwound by the "off-top" system. Since the yarn feeding devices of turntable units $C_1$ and $C_2$ are identical, only the upper device will be further described. Attached to rotating support 37 and extending radially over bobbins 48 is a spider 49 upon which are secured a number of porcelain yarn guide bushes 50, each located in vertical alignment with the vertical axis of its underlying bobbin 48. Directly above each bush 50 is fitted a small rubber pulley 51 (Figs. 5 and 6a), supported by a bracket 52, attached to spider 49. Each pulley 51 is braked by a spring 53 which exerts an end pressure that is adjusted by means of a threaded nut 54. As each yarn is unwound from its bobbin 48, it is brought up through the corresponding bush 50 and is wound one full turn around the adjacent rubber pulley 51 which, being braked by its spring 53, imparts to the yarn a slight but constant tension. Each yarn passes through a porcelain bush 55 on feed ring 56, then up through a hole 57 and a notch 58 in a guide crown 59, and under guide ring 60 which is attached to the top of crown 59. (See Figs. 5 and 6b.) On crown 59 are hinged at 61 a number of stop-motion pawls 62 (one for each yarn), each having at its upper end a lug 62a which bears by centrifugal force against a yarn, as shown in Fig. 6b. In case the yarn breaks, the corresponding pawl 62 is swung outwardly and downwardly on its hinge 61, by the centrifugal force of rotating crown 59, until it contacts a metal ring 63 that is electrically insulated from the machine on which it is carried. The contact of any pawl 62 with ring 63 closes an electric circuit (not shown), whereby motor 34 of driving unit 23 (Fig. 1) is stopped.

After leaving guide ring 60 on crown 59, each yarn follows the rifled surface of an outer drift 64 (Figs. 5 and 6c) and passes through one of a series of slots 65 (inclined with respect to the axis of rotation) in a reed 66, and is spirally laid on the surface of the rubber tubing T which is passing up through the center of reed 66. The outer drift 64 (Figs. 5 and 6c) is secured to the rotating element 37 and coacts with an inner drift 67 which is attached to the fixed element 40 and must perform the task of guiding the rubber tube T near the point at which it is spirally covered with the yarn. At the same time, inner drift 67 prevents the rubber tubing T from coming into contact with the rotating drift 64.

Rubber strip feeding device

Between the two spiral yarn wrappings there is interposed a thin sheet of rubber which actually consists of a rubber strip R, having a width corresponding to the circumference of the tubing T, which is laid longitudinally over the inner layer of yarn and is in turn overlaid by the outer layer of yarn. The width of the rubber strip R is such that the tubing T, after being covered by the first layer of yarn, can be sheathed by the strip R with a small overlapping of its edges.

As indicated in Figs. 7 and 8, the rubber strip R is charged on the machine in the form of rolls 68 and 68'; having a diameter of about 1.5 feet, and is wound in such a roll with a separating fabric tape F to prevent any contact between adjacent wraps of strip R. The feed of strip R is continuous and this continuity is insured by the use of two feeding units which are operated simultaneously but, used alternately, so that when one roll is nearly run out, the operator inserts the free end of a new roll already mounted in the other feeding unit. While this latter roll is being unwound, the operator replaces the empty roll with a full one. Driving power is transmitted to the upper and lower feeding units (Figs. 7 and 8) by a shaft 69 which is driven by a chain 70 from a gear unit 71 (Fig. 4) that in turn is driven by a belt 72 from shaft 28. On shaft 69 (Fig. 8) are keyed two pulleys 73 and 74 by which power is transmitted to both feeding units. As these feeding units are identical, only one (the upper) will be further described.

As shown in Figs. 7 and 8, the various elements of the feeding unit are supported by a bracket 75 attached to the frame of the yarn winding machine. Power is transmitted from pulley 73 to a pulley 76 by a belt 77. In order to have the feeding speed of rubber strip R adjusted to the exact value required by the yarn winding machine, the diameter of pulley 76, which is formed of expansible sectors (Fig. 8), can be gradually varied as desired, within given limits, by manually rotating a hand wheel 78 which is threaded on a sleeve 79 and imparts an axial thrust against the larger end of a conical bushing 80 which in turn moves the expansible sectors of pulley 76. The roll 68, containing the wound-up rubber strip R and fabric tape F, is inserted endwise over a supporting shaft 81 (Fig. 7) and as strip R is unwound from roll 68, the fabric strip F is wound up on a roller 82 which is loosely mounted on a shaft 83, journalled in one end of a lever 84 that is pivoted at 85 to bracket 75. Lever 84 is provided with a pendant weight 86 which insures that the roll of fabric is kept in frictional contact with a cylinder 87 that is keyed to a shaft 88. Also mounted on bracket 75 are a pair of rollers 89 and 90, driven respectively by means of belts 91 and 92 from a pulley 93 attached to cylinder 87. The roll 68 of rubber strip R and fabric tape F is braked by a fraction arm 93, pivoted at 94 and held in contact with the surface of roll 68 by a weight 95 (Fig. 7).

As rubber strip R and fabric tape F are unrolled from roll 68 they pass over cylinder 89 where they separate; the fabric tape F going to roller 82 where it is wound up into a roll friction driven by cylinder 87, while rubber strip R passes over cylinder 90 and return rollers 96 and 97 to guide rollers 98 (Fig. 5) and thence to the rubber tubing T which has already been covered with the inner layer of yarn at the lower winding station C₂. Directly after rubber strip R is applied to tubing T, said strip is bound thereon by the second spiral yarn covering applied at upper station C₁ (Fig. 5). On shaft 88 (Fig. 8) is keyed handwheel 99 which is controlled by the operator to cause the first length of rubber strip R to be unwound from a new roll. The overrunning of rubber strip unwinding, in respect to control motion transmitted from shaft 69 is obtained by the free wheel devices 100 and 101 whereon are fitted the driving pulleys 73 and 74.

*Yarn locking device*

This device (Fig. 10) is provided so that whenever the spiral winding machine is stopped by the operator, the stop mechanism 62—63, or otherwise, the two layers of yarn by which the spiral covering is formed are locked on their drifts. This locking action is obtained by means of two locking rings 102 and 102' each of which comprises a metal collar 103 in which is seated a rubber ring 104. When the spiral winding machine is stopped, both rings 102 and 102' are pressed by actuating devices described below against the outside surfaces of their corresponding drifts, so as to lock both yarn layers, in order to prevent any faults in the spiral covering due to the shrinking of the uncured rubber tubing. The actuating devices by which rings 102 and 102' are controlled operate as follows: both rings (102 and 102') are supported by levers 105 and 105', pivoted at 106 and 106', and are kept in their locking positions by springs 107 and 107'. Rings 102 and 102' are lifted to unlocking position by means of a rod 108 which is secured to a lever 109, pivoted at 110, and connected at its other end through a link 111 to the core 112 of an electro-magnet 113. One end of a bell-crank lever 114 pivoted at 115, is connected to an electromagnet 116, while the opposite end of said lever is provided with a lug 117 which is adapted to engage a pin 118, when the left end of lever 114 is lowered by electromagnet 116, by reason of a spring 119 attached to an arm 120 of lever 114. When the yarn winding machine is stopped, both rings 102 and 102' are kept in their locking position by springs 107 and 107'. When the machine is started, electromagnet 113, which is connected to the starting circuit of motor 34 (Fig. 1), is energized, whereupon core 112, link 111, and the right end of lever 109 are raised. This lowers the left ends of levers 109, 105 and 105' which in turn raises rings 102 and 102' to their unlocked position. At the same time, the energizing of electromagnet 116 causes bell-crank lever 114 to engage pin 118 on lever 109 which holds rings 102 and 102' in unlocked position. When the yarn winding machine is stopped, electromagnets 113 and 116 are deenergized which causes a disengagement of lever 114 from lever 109 and a lowering of rings 102 and 102' to their locking positions by reason of the springs 107 and 107'. Rings 102 and 102' can, however, be lifted independent of the actions of electromagnets 113 and 116, by the manual actuation of levers 119 and 119' which through attached eccentric cams 120 and 120' and links 121 and 121' are adapted to raise and lower levers 105 and 105'.

The rubber tubing T, which is to be covered according to my improved process, is made of uncured rubber without a core, and is inflated to its normal size, in order to increase its firmness, before the covering operation commences. After the rubber tubing T is covered with its two layers of yarn and an interposed layer of sheet rubber, the covered tubing passes to cylindrical pan 21 where it is manually wound into coils of suitable length. When the assembled hose is heat-treated, the rubber sheathing R and the adjacent layers of spirally wound yarn, are firmly bonded together.

The spiral winding of the yarn in two separate layers, by bobbins which move in simple (non-intersecting) circular paths, not only permits a great simplification of the yarn covering machine, as compared to prior art braiding machines, but also speeds up the covering operation nearly tenfold; both of which features result in substantial reduction of the cost of production. Also, by spirally winding the yarn layers in opposite direction with the pitch of each layer adjusted as desired, and simultaneously applying an interposed rubber strip longitudinally over the inner layer of yarn, and then vulcanizing the rubber tubing and strip to the adjacent yarn layers, I am able to produce a hose of equal or superior strength and flexibility, as compared with hose having braided yarn coverings.

Whil I have shown and described the preferred embodiment of my invention I do not limit myself to the details of construction, operation or method, disclosed by way of illustration, as these may be changed or modified by those skilled in the art without departing from the spirit of my invention or exceeding the scope of the appended claims.

I claim:

1. A machine of the air mandrel type for the manufacture of thread reinforced rubber hose, comprising a feeding mechanism for passing a crude rubber tube upwardly along a generally vertical axis of said machine, upper and lower spaced stationary supports each having a central portion arranged coaxially of the machine, a pair of multiple bobbin-carrying the platforms, drive means to rotate said platforms about the axis of the machine in opposite directions, each of said platforms being mounted for rotation upon the central portion of one of said stationary supports, thread guide mechanisms carried by the bobbin-carrying platforms constructed and arranged to pass thread substantially coaxially of each of the bobbins to be wound on said tube at spaced locations, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads in opposite directions separated by a thin layer of rubber.

2. A machine of the air mandrel type for the manufacture of thread reinforced rubber hose, comprising a feeding mechanism for passing a crude rubber tube upwardly along a generally vertical axis of said machine, upper and lower spaced stationary supports each having a central portion arranged coaxially of the machine, a pair of multiple bobbin-carrying platforms, drive means to rotate said platforms about the axis of the machine in opposite directions, each of said platforms being mounted for rotation upon the central portion of one of said stationary supports, thread guide mechanisms carried by the bobbin-carrying platforms constructed and arranged to pass thread substantially coaxially of each of the bobbins to be wound on said tube at spaced locations, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads in opposite directions separated by a thin layer of rubber, and speed control means for said drive means to vary the relative speed of said two platforms and thereby the pitch of the helices of one set of threads with respect to the other to balance the twisting moments when said hose is subjected to internal pressure.

3. A machine of the air mandrel type for the manufacture of thread reinformed rubber hose, comprising a feeding mechanism for passing a crude rubber tube upwardly along a generally vertical axis of said machine, upper and lower spaced stationary supports each having a central portion arranged coaxially of the machine, a pair of multiple bobbin-carrying platforms, drive means to rotate said platforms about the axis of the machine in opposite directions at predetermined speeds, each of said platforms being mounted for rotation upon the central portion of one of said stationary supports, conical thread guide mandrels mounted on the central portion of said platforms to rotate therewith, clamping associated with said mandrels to clamp the threads in place on said mandrels only when the machine has been brought to a full stop, tensioning mechanisms carried by the bobbin-carrying platforms constructed and arranged to pass thread substantially coaxially of each of the bobbins to be wound on said tube at spaced locations, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads in opposite directions separated by a thin layer of rubber.

4. A machine of the air mandrel type for the manufacture of thread reinforced rubber hose, comprising a feeding mechanism for passing a crude rubber tube upwardly along a generally vertical axis of said machine, upper and lower spaced stationary supports each having a central portion arranged coaxially of the machine, a pair of multiple bobbin-carrying platforms, drive means to rotate said platforms about the axis of the machine in opposite directions, each of said platforms being mounted for rotation upon the central portion of one of said stationary supports, thread guide and tensioning mechanisms carried by the bobbin-carrying platforms constructed and arranged to pass thread substantially coaxially of each of the bobbins to be wound on said tube at spaced locations, said tension mechanism comprising a rubber roller about which the thread is wrapped one turn, a pivotal mounting for said roller including an adjustable spring tension means restraining rotation thereof, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads in opposite directions separated by a thin layer of rubber.

5. A machine of the air mandrel type for the manufacture of thread reinforced rubber hose, comprising a feeding mechanism for passing a crude rubber tube upwardly along a generally vertical axis of said machine, upper and lower spaced stationary supports each having a central portion arranged coaxially of the machine, a pair of multiple bobbin-carrying platforms, drive means to rotate said platforms about the axis of the machine in opposite directions, each of said platforms being mounted for rotation upon the central portion of one of said stationary supports, a plurality of bobbins mounted on each platform and secured against rotation with respect thereto, thread guide and tensioning mechanisms carried by the bobbin-carrying platforms constructed and arranged to pass thread substantially coaxially of each of the bobbins to be wound on said tube at spaced locations, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads in opposite directions separated by a thin layer of rubber.

6. A machine of the air mandrel type for the manufacture of thread reinforced rubber hose, comprising a reel for the storage of inflated crude rubber tube, a feeding mechanism for passing said crude rubber tube upwardly along a generally vertical axis of said machine, an unreeling mechanism for passing said crude rubber tube to said feeding mechanism, drive means interconnecting said feeding mechanism and said unreeling mechanism to synchronize the speeds thereof, upper and lower spaced stationary supports each having a central portion arranged coaxially of the machine, a pair of multiple bobbin-carrying platforms, drive means to rotate said platforms about the axis of the machine in opposite directions, each of said platforms being mounted for rotation upon the central portion of one of said stationary supports, thread guide mechanisms carried by the bobbin-carrying platforms constructed and arranged to pass thread substantially coaxially of each of the bobbins to be wound on said tube at spaced locations, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads in opposite directions separated by a thin layer of rubber.

7. A machine of the air mandrel type for the manufacture of thread reinforced rubber hose, comprising a feeding mechanism for passing a crude rubber tube upwardly along a generally vertical axis of said machine, upper and lower spaced stationary supports each having a central portion arranged coaxially of the machine, said central portions each forming a guide mandrel to center said crude rubber tube, a pair of multiple bobbin-carrying platforms mounted to rotate about the axis of the machine in opposite directions, each of said platforms being mounted for rotation upon the central portion of one of said stationary supports, thread guide mechanisms carried by the bobbin-carrying platforms constructed and arranged to pass thread substantially coaxially of each of the bobbins to be wound on said tube at spaced locations adjacent said guide mandrels, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads adjacent the ends of said stationary guide mandrels in opposite directions separated by a thin layer of rubber.

8. A machine of the air mandrel type for the manufacture of thread reinforced rubber hose, comprising a motor driven feeding mechanism for passing a crude rubber tube upwardly along a generally vertical axis of said machine, upper and lower spaced stationary supports each having a central portion arranged coaxially of the machine, a pair of multiple bobbin-carrying platforms, drive means to rotate said platforms about the axis of the machine in opposite directions, each of said platforms being mounted for rotation upon the central portion of one of said stationary supports, conical thread guide mandrels mounted on the central portion of said platforms to rotate therewith, clamping means associated with said mandrels to clamp the threads in place on said mandrels upon stopping of the machine, solenoid operated means energized simultaneously with starting said feed mechanism motor to release said clamping means, tensioning mechanisms carried by the bobbin-carrying platforms constructed and arranged to pass thread substantially coaxially of each of the bobbins to be wound on said tube at spaced locations, a crown thread-guide secured to said bobbin-carrying platforms adjacent a central aperture thereof through which said crude rubber tube passes, a guide mechanism secured to said upper stationary support for feeding a thin strip of rubber longitudinally of said tube intermediate said spaced locations of a width sufficient to surround said tube of crude rubber, whereby said crude rubber tube is wound by two sets of helices of threads in opposite directions separated by a thin layer of rubber.

References Cited in the file of this patent

UNITED STATES PATENTS

| Number | Name | Date |
|---|---|---|
| 83,132 | Coles et al. | Oct. 20, 1868 |
| 817,187 | Palmer et al. | Apr. 10, 1906 |
| 1,017,232 | Rahm | Feb. 13, 1912 |
| 1,028,067 | Bolton | May 28, 1912 |
| 1,767,693 | Morin | June 24, 1930 |
| 1,855,900 | Bardsley | Apr. 26, 1932 |
| 1,878,885 | Pahl | Sept. 20, 1932 |
| 1,937,918 | Smith et al. | Dec. 5, 1933 |
| 1,943,716 | Bardsley | Jan. 16, 1934 |
| 1,997,626 | Caldes | Apr. 16, 1935 |
| 2,057,789 | Petersen | Oct. 20, 1936 |
| 2,093,206 | Muller | Sept. 14, 1937 |
| 2,151,307 | Smith | Mar. 21, 1939 |
| 2,245,749 | Bellman | June 17, 1941 |
| 2,281,111 | Robinson et al. | Apr. 28, 1942 |
| 2,423,289 | Bellg | July 1, 1947 |
| 2,491,152 | Beidle | Dec. 13, 1949 |